United States Patent [19]

Denz

[11] Patent Number: 5,404,750

[45] Date of Patent: Apr. 11, 1995

[54] METHOD FOR DETECTING LEAKY INJECTION VALVES IN AN INTERNAL COMBUSTION ENGINE

[75] Inventor: Helmut Denz, Stuttgart, Germany

[73] Assignee: Robert Bosch GmbH, Stuttgart, Germany

[21] Appl. No.: 170,616

[22] Filed: Dec. 20, 1993

[30] Foreign Application Priority Data

Dec. 19, 1992 [DE] Germany .................. 42 43 178.6

[51] Int. Cl.$^6$ ........................................... G01M 15/00
[52] U.S. Cl. ..................................... 73/119 A; 73/47
[58] Field of Search .................. 73/119 A, 47, 116

[56] References Cited

U.S. PATENT DOCUMENTS

| | | | |
|---|---|---|---|
| 3,919,885 | 11/1975 | Kaireit | 73/119 A |
| 4,499,876 | 2/1985 | Yamamoto | 73/119 A |
| 4,785,771 | 11/1988 | Ibuki et al. | 73/119 A |
| 4,791,808 | 12/1988 | Lackner et al. | 73/119 A |
| 5,117,793 | 6/1992 | Taue et al. | 123/436 |

FOREIGN PATENT DOCUMENTS 4235326 8/1992 Japan .................. 73/119 A

OTHER PUBLICATIONS

"Bosch Kraftfhartechnisches Taschenbuch" 19th edition, 1984, pp. 366 to 373.

Primary Examiner—Richard E. Chilcot, Jr.
Assistant Examiner—James M. Olsen
Attorney, Agent, or Firm—Walter Ottesen

[57] ABSTRACT

The invention is directed to a method for detecting leaky injection valves for an internal combustion engine. The method applies for the start operation under pregiven conditions wherein all cylinders are ignited, even those where there is no injection. A measurement of rpm and a monitoring takes place such that an rpm increase is clearly detected. This increase in rpm is caused by an additional firing in one cylinder. This method is processed in the control apparatus of the engine and can be adapted to various requirements and can be run through for each start or only for each m-th start. The activation of the method can be limited to specific engine temperatures or engine temperature curves.

15 Claims, 3 Drawing Sheets

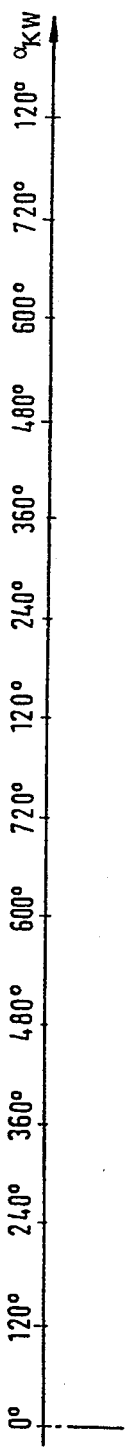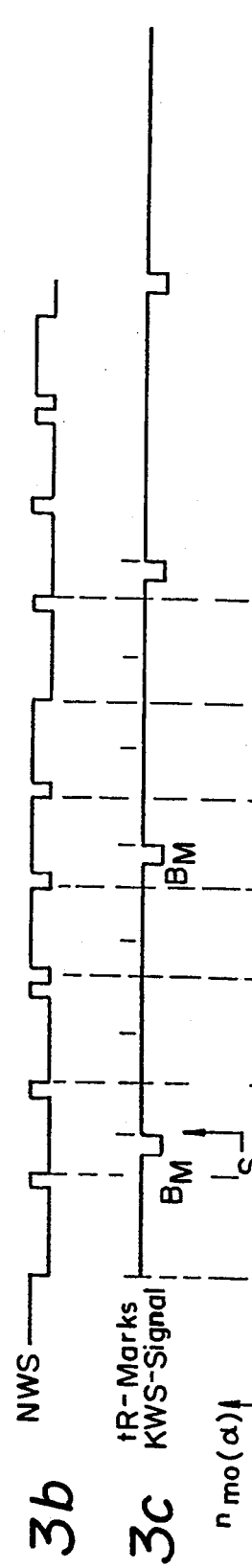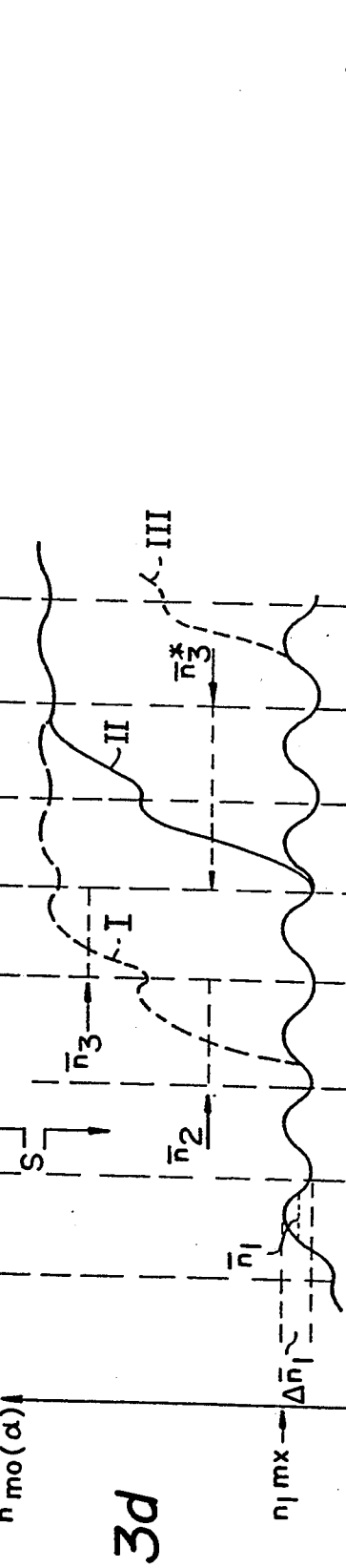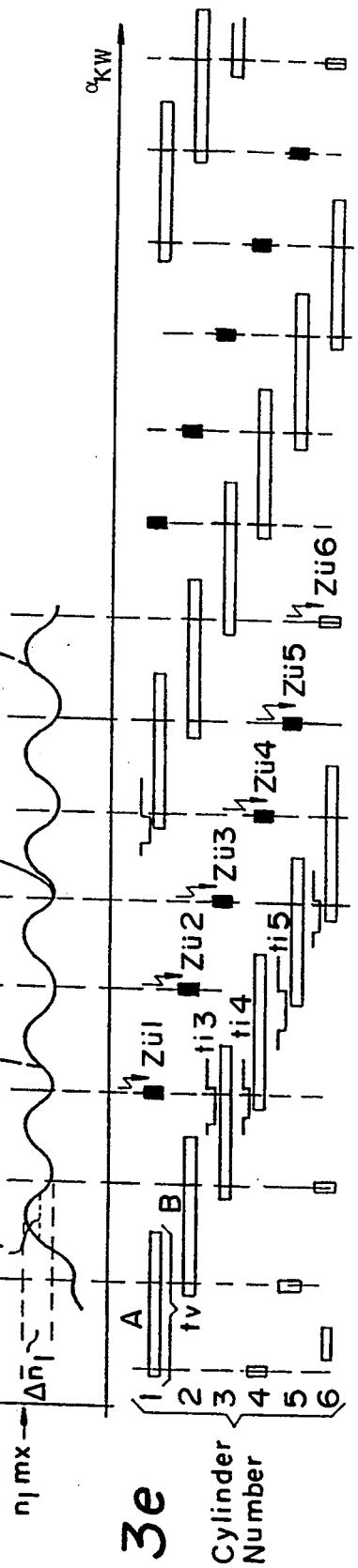

METHOD FOR DETECTING LEAKY INJECTION VALVES IN AN INTERNAL COMBUSTION ENGINE

FIELD OF THE INVENTION

The invention relates to a method for detecting leaky injection valves for an internal combustion engine equipped with external ignition and having an injection apparatus.

BACKGROUND OF THE INVENTION

In combustion engines of the type referred to above, an electric fuel pump draws fuel from a tank and forces this fuel into the lines which lead to the injection valves. Each cylinder of the engine is provided with its own injection valve which injects fuel under high pressure into the intake pipe of the engine or into the inlet channel. Such a gasoline injection system is described in the publication entitled "Bosch Kraftfahrtechnisches Taschenbuch", 19th edition, 1984, pages 366 to 373.

In these injection systems, the danger is present that fuel can reach the intake pipe from the pressure store when the engine is shut off and when the injection valves leak. For the next start of the engine, this condition can lead to a mixture which is excessively rich, to start misfires or to an extended starting operation while at the same time leading to high emissions of toxic materials.

SUMMARY OF THE INVENTION

The method of the invention affords the advantage that leaky injection valves can be reliably detected without additional components being necessary.

For the above purpose, non-injected cylinders are also ignited during the starting operation after an adequate shutoff time is detected and after synchronization has taken place and, monitoring takes place as to whether one or several firings take place in these non-injected cylinders after the ignition. Since these firings would lead to an increased rpm, the detection of the firings is especially simple in that the rpm curve is evaluated in advance of and after the first ignitions.

The additional firings are detected when the rpm after the first ignitions of the non-injected cylinders is greater than the rpm in advance of the first ignitions. For this reason, the leaky injection valves are also detected.

It is especially advantageous that the check as to tightness of the injection valves does not have to be carried out with each start. Furthermore, it is advantageous that the check does not lead to a prolonged start time.

A first sensitive check for detecting slight leakages and further non-sensitive checks for detecting large leakages are carried out because the various test conditions can be determined.

BRIEF DESCRIPTION OF THE DRAWINGS

The invention will now be described with reference to the drawings wherein.

DESCRIPTION OF THE PREFERRED EMBODIMENTS OF INVENTION

Figure 1:
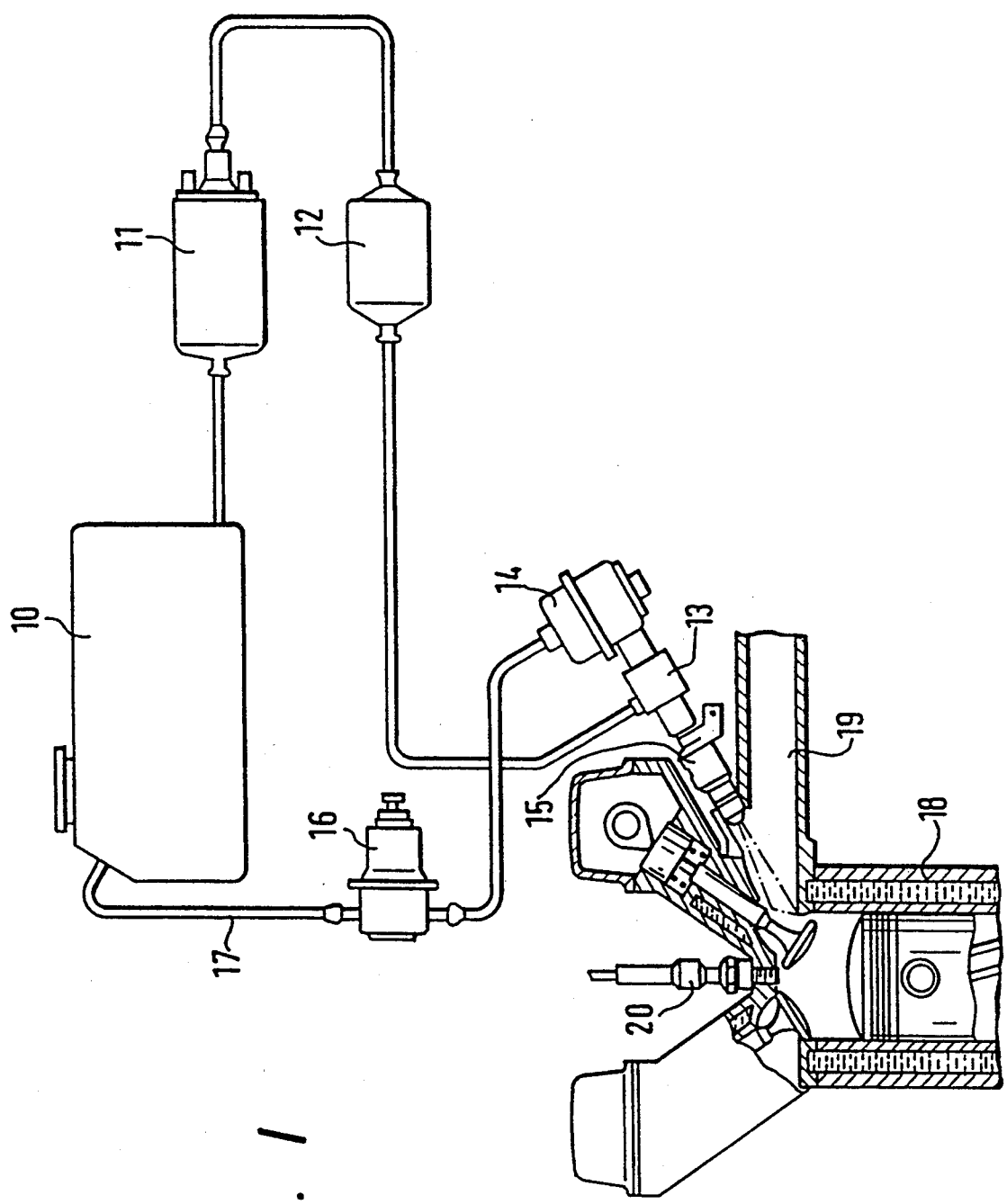
FIG. 1 is a schematic providing an overview of the components of the invention of the injection system of an internal combustion engine.

FIG. 1 is a schematic of a fuel-supply system wherein the fuel contained in a fuel tank 10 is pumped by the electric fuel pump 11 through a fuel filter 12 to the fuel-distributor pipe and fuel-pressure store 13. A pressure controller 14 controls the fuel pressure which is available to the injection valve 15. The excess fuel returns to the fuel tank 10 via a vibration damper 16 and the return line 17.

The injection valve 15 injects the fuel as required into the intake pipe 19 near the cylinder 18 and the resulting mixture is ignited with the aid of the spark plug 20. The entire system is controlled with the aid of a control apparatus (not shown).

In a four-stroke engine, the crankshaft rotates twice per work cycle so that the crankshaft passes through an angle of 720° before a cylinder is again in the same work position. In such a four-stroke engine, a synchronization is carried out after the start and before the first ignitions takes place.

For this purpose, it is known to carry out this synchronization with the aid of a crankshaft transducer and a camshaft transducer and to furthermore generate injection signals and ignition signals in the control apparatus. These signals ensure that an injection and an ignition, respectively, take place for each correct position. In this connection, reference may be made to U.S. patent application Ser. No. 08/087,687, filed Jul. 2, 1993, which is incorporated herein by reference.

In such a system, a method for detecting leaky injection valves is run through and will now be explained with reference to the flowchart shown in FIG. 2. This method takes place in addition to the conventional open-loop and closed-loop control of the ignition and injection in [he control apparatus. The necessary data are also stored in the control apparatus.

It must be ensured that several required preconditions are satisfied so that the method for detecting leaky injection valves is run through reliably.

One of these conditions is that, for the last operation of the engine, not only a start attempt has been carried out but also a proper operation has taken place. Further such conditions, as well as their reliable detection, become apparent from the description of the method of the invention explained with respect to the flowchart of FIG. 2. The relationships required for understanding the foregoing can be seen in FIGS. 3a to 3e as well as in the description corresponding thereto.

Figure 2:
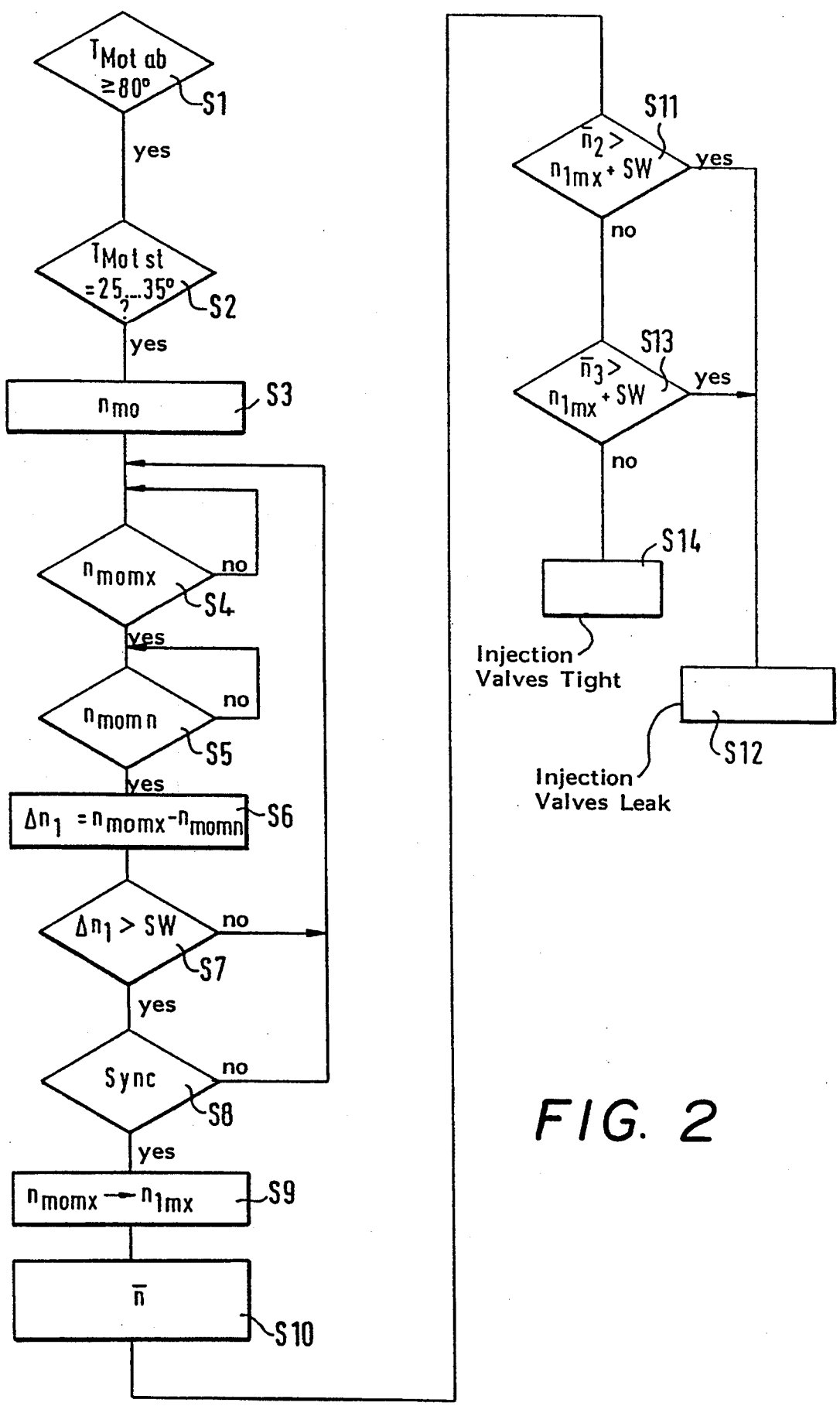
FIG. 2 is a flowchart showing the steps of an embodiment of the method of the invention; and, FIGS. 3a to 3e show several of the essential relationships between the position of the crankshaft and the camshaft of the engine and the injection angle or injection time as well as the ignition angle and ignition time as a function of crankshaft angle and time.

In the method of FIG. 2, data are determined in step S1 from the data previously stored in the control apparatus as to whether the engine temperature $T_{Motab}$ for the previous operation is greater than or equal to 80° C. If in step S1, it is recognized that this is the case, then it is determined with certainty that the previous operation of the engine was a proper operation. A check is then made in step S2 as to whether the engine temperature $T_{motst}$ at the start is in a range between approximately 25° to 35° 1 C.

The program continues to run to detect leaky injection valves only when this condition is also satisfied.

If in contrast, it is detected in steps S1 or S2 that the required condition is not satisfied, then no adequate shutoff time or a shutoff time which is too short is present or the previous operation was too short so that the method of the invention can no longer be carried out.

In step S3, rpm pulses are detected at the start and an instantaneous rpm $n_{mo}$ is formed in the usual manner from tooth periods. A tooth period is the time spacing between two teeth of a transducer end which run past a transducer. The instantaneous rpm $n_{momx}$ is monitored in step S4 as to whether or not an rpm maximum $n_{momx}$ is present. If this condition is not satisfied, then step S4 is run through again. Only when the condition is satisfied does a monitoring take place in the next step S5 as to an instantaneous rpm minimum $n_{momn}$. In steps S4 and S5, monitoring takes place first with respect to an rpm maximum $n_{momx}$ and then with respect to an rpm minimum $n_{momn}$ after rpm pulses at the start have been recognized and after instantaneous rpm values were formed in step S3.

In step S6, the rpm difference $\Delta n_1 = n_{momn} - n_{momn}$ is formed. In step S7, this rpm difference is compared to a pregiven threshold value SW. If the difference $\Delta n_1$ is greater than the threshold value SW, then the assumption is made that the starter has already brought the engine to the required starter rpm with no firings having taken place. However, if this is not the case, in step S7, the recognition is made that $\Delta n_1$ is not greater than the pregiven threshold value and the step S4 can again be carried out. Accordingly, a check can again be made as to whether the instantaneous rpm has an rpm maximum or an rpm minimum (step S5).

This inquiry can, however, only take place until one segment is run through after the synchronization; that is, until after a region between two camshaft marks is passed through. Otherwise, the start duration would be unnecessarily prolonged.

However, if it is recognized in step S6 that the threshold value SW for $\Delta n_1$ is exceeded, then, for a positive result in step S7, a check is made in step S8 as to whether a synchronization has taken place in the meantime. If this synchronization has not taken place, then step S4 is again activated under the already-mentioned preconditions. This is continued until the synchronization is recognized. If the synchronization is recognized in step S8, then the last rpm value $n_{momx}$ is set as the rpm value $n_{1mx}$. This is shown in the flowchart at step S9.

In the next step S10, the detection of the mean rpm $\bar{n}$ is carried out in the usual manner from the segment periods starting with $\bar{n}_1$. Times are formed, for example, from the spacings of the negative flanks of a camshaft transducer signal with the flanks lying close to the start ignition angle. These times are inversely proportional to the rpm. Forming rpm mean values in this way affords the advantage that approximately the mean rpm is formed between two ignitions. Averaging takes place over a range in which the transducer wheel has rotated through a segment, for example, a 90° defined angle. The control apparatus starts emitting the emission pulses and the injection pulses simultaneously with this rpm detection.

The non-injected cylinders are ignited at this time point. For this reason, an increase in rpm takes place which is dependent upon the presence of a leaky injection valve. This is recognized in the next steps.

The detection described in step S10 of the mean rpm $\bar{n}$ continues to run continuously during the operation of the engine. The first mean rpm $\bar{n}_2$ detected directly after emission of the first ignition is then checked in step S11 as to whether it lies significantly above the rpm value $n_{1mx}$. If this is the case, then a firing must have occurred without the corresponding cylinder having received an injection. This is only possible when at least one of the injection valves is leaky so that fuel can reach the intake pipe at the affected location. The recognition that one of the injection valves leaks takes place in step S12.

If it is recognized in step S11 that the mean rpm $\bar{n}_2$ is significantly below the rpm $n_{1mx}$, then a check is made in step S13 as to whether the rpm $\bar{n}_3$ is greater than the rpm $n_{1mx}$ plus the threshold value. If this is the case, then at least one injection valve must leak and this is recognized in step S12. If in contrast, the condition of the step S13 is not satisfied, then no additional firings occur. From this, it is recognized that all injection valves are tight. The recognition that all injection valves are tight is shown as step S14.

When the injection valves are tight, then a run up of the rpm takes place only after the first possible injection and after the corresponding ignition. In this way, the rpm $\bar{n}_3$ can only then be significantly above the rpm $n_{1mx}$.

The possibly occurring rpms are plotted in FIG. 3 as a function of the crankshaft angle $\alpha_{KW}$. Furthermore, the relationship between the camshaft signal and the crankshaft signal as a function of the angle and the time is plotted in FIG. 3. Additionally, the injection times and the ignition time points for the individual cylinders for the example of a six-cylinder engine are provided. Here, a transducer system is utilized as described in U.S. patent application Ser. No. 08/087,687 referred to above.

FIG. 3 specifically shows the crankshaft angle $\alpha_{KW}$ and the time t. In FIG. 3b, the crankshaft signal NWS is shown having rear flanks which operate as ignition marks. In FIG. 3c, the crankshaft signal as well as trigger marks tR are shown. The reference marks are identified by BM.

The instantaneous rpm $n_{mom}(\alpha_{KW})$ as well as various rpms $n_{1mx}$, $n_1$, $n_2$, $n_3$ are shown for three different conditions.

Numeral I represents at least one leaky injection valve and, for numeral II, the injection valves are tight. At numeral III, the injection is delayed so that more injection valves can be monitored as to leakage.

FIG. 3e shows the relationships known per se between injection and ignition for the individual cylinders of a six-cylinder engine and are shown in the usual manner. The first injection and ignition signals take place after synchronization is successfully completed which is identified by S. The injection pulses are identified by ti3, ti4, ti5 and so on; whereas, the injection valves are open during the phases A, B, etc. The ignitions are identified by Zü1, Zü2, et cetera.

The method shown in FIG. 2 is a possible embodiment of the method which can be expanded or changed at various positions. The following variations are possible in dependence upon the requirement.

In addition to the rpms already given, the instantaneous rpm as well as the maximum value of the rpm can be formed also after the first ignition.

The mean rpm $\bar{n}$ does not have to be derived from the camshaft transducer signal; instead, the mean rpm $\bar{n}$ can, for example, be determined from the time spacing between two ignitions. In this case, a slight error can occur for ignition angle changes.

It is possible to utilize an rpm value $\bar{n}$, which is averaged over one camshaft segment, as a reference in lieu of the rpm value $n_{1mx}$.

The formation of the rpm mean value reference can be delayed, for example, until two camshaft transducer segments have been passed through. In this way, it is ensured that steady-state conditions are already present after the start operation.

In a further embodiment, it is possible to delay the start of injection in order to monitor several ignited cylinders which have not been injected. This procedure provides the rpm change shown in FIG. 3 by curve III.

Leaky injection valves can be recognized by forming a corresponding recognition signal only when at least two or still more uninjected cylinders fire.

The execution of the check as to whether the injection valves are leaky and the possible delay of the injection can be limited to a narrow start temperature range in that the engine temperatures, which are checked in steps S1 and S2, are correspondingly adapted. It is furthermore also possible that a check as to leakage does not take place for each start, but instead, for example, only for each fifth start or generally for each m-th start. In this way, the start duration is not unnecessarily extended in the normal case.

When leaky injection valves are detected for the first time in step S12, a transfer can be made in the above-mentioned case to carry out the check as to tightness of the injection valves for each start. The delay of injection, which is introduced as required, can be carried out without delay only after detection of leaky injection valves.

In lieu of one leaky injection valve, several leaky injection valves can be detected in dependence upon the variation utilized. It is also possible to use more sensitive checks which permit all leaks and even slight leaks to be detected. On the other hand, it is possible to only detect large leaks with the aid of the delayed injection.

Whether a leakage is small or large can also be distinguished in that the shutoff times for which the increase in rpm takes place without injection can be evaluated. Here, for a short shutoff time, a large leak can be detected and, from a run up, which occurs several times after long shutoff times, the detection of a slight leakage takes place.

In addition, for normal start operations, a check can be made to determine if no rpm increase occurs for the injected and ignited cylinders. If this is the case, this indicates that a rich mixture results because of leaky injection valves which hinders a firing. In this way, the suppression of the first injection pulses for detecting leakage can take place only after delayed normal starts of this kind. As long as normal starts take place with immediate firing, the suppression of the first start injections never takes place, that is, there is no burdensome prolonged start period.

A further possibility for checking the injection valves as to leakage can take place after any desired shutoff time if the previous operating cycle has clearly taken place out of the start operation with a positive engine run up and the shutoff of the engine by cutting off the injection takes place with continuing ignition. For this purpose, however, the ignition coil must be supplied via a relay driven via the control apparatus, for example, the EKP-relay and not directly from terminal KL15.

In this embodiment, it is ensured that no fuel can be prestored by means of a normal injection pulse. In this way, it can be made possible that also valves with large leakage, which can lead to very large excesses of fuel for longer shutoff times, can nonetheless be detected and so not cause firings even after a short shutoff time.

It is understood that the foregoing description is that of the preferred embodiments of the invention and that various changes and modifications may be made thereto without departing from the spirit and scope of the invention as defined in the appended claims.

What is claimed is:

1. A method for detecting leaky injection valves in an internal combustion engine, the method comprising the steps of:

when starting the engine and after synchronization is completed, igniting cylinders which are injected and those cylinders which are not injected;

making measurements of engine rpm for determining at least a first rpm during the starting phase in advance of the first ignition of said starting phase and at least a second rpm after said first ignition;

comparing said first and second rpms to each other; and, detecting at least one leaky injection valve when said first rpm differs from said second rpm in a pregiven manner.

2. The method of claim 1, wherein the engine has a maximum value $n_{1mx}$ of engine rpm and the maximum value $n_{mx}$ of the engine rpms is determined in advance of synchronization or in advance of the first ignition; and, said maximum value $n_{1mx}$ is used as said first rpm.

3. The method of claim 1, comprising the further step of detecting a leaky injection valve when the value of the first mean rpm $\overline{n_2}$, which is detected after the first ignition, is greater than the maximum rpm $n_{1mx}$ in advance of the first ignition plus a pregiven threshold value.

4. The method of claim 3, comprising the further step of detecting a leaky injection valve when the value of an additional mean rpm $\overline{n_3}$ is greater than the maximum rpm $n_{1mx}$ in advance of the first ignition plus a pregiven threshold value.

5. The method of claim 1, comprising the further steps of:

forming instantaneous rpms;

determining either the maximum values of said instantaneous rpms or the minimum values of said instantaneous rpms; and, then continuously forming mean rpm values.

6. The method of claim 1, wherein the ignition of the non-injected cylinders takes place only for each m-th start operation.

7. The method of claim 1, further comprising the steps of suppressing a pregiven number of injections during the starting operation and thereby igniting a defined larger number of cylinders without injection.

8. The method of claim 7, wherein the first injections are suppressed and a greater number of non-injected cylinders are ignited only for each m-th starting operation.

9. The method of claim 1, further comprising the steps of: for starting operations with normal injection and ignition, first checking whether no pregiven rpm increase has taken place after ignitions have taken place; and, in this case only and for subsequent starting operations, suppressing so many injections that at least one ignition takes place without injection for all cylinders.

10. The method of claim 1, further comprising the steps of:

determining the temperature of the engine; and, only igniting the non-injected cylinders when pregiven conditions are present for the temperature of the engine.

11. The method of claim 10, wherein said temperature is in a range between 25° to 35° C.

12. The method of claim 1, the engine being equipped with a control apparatus having a memory and the method further comprising the steps of:
  determining the temperature of the engine when the engine is shut off;
  storing said temperature of the engine in said memory; and,
  with the next start attempt, comparing said temperature to a threshold value.

13. The method of claim 1, further comprising the steps of:
  determining the time duration that the engine has been switched off before a run-up of the engine takes place without injection;
  checking whether an increase in rpm takes place in advance of said first injection;
  if an increase in rpm has taken place in advance of said first injection and said time duration is less than a predetermined time duration, then drawing a conclusion that a leak of the injection valves is a large leak; and,
  if an increase in rpm has taken place in advance of said first injection and said time duration is greater than a predetermined time duration, then drawing a conclusion that a leak of the injection valves is a small leak.

14. The method of claim 1, further comprising the step of, for shutting off the engine, only cutting off the injection and operating the ignition until the engine is at standstill thereby securing for the next start of the engine that no fuel is in the cylinders when the injection valves are tight which could lead to a run up without previous injection.

15. The method of claim 1, further comprising the step of providing a display after detecting at least one leaky injection valve and nonetheless allowing normal operation of the engine to continue.

* * * * *

UNITED STATES PATENT AND TRADEMARK OFFICE
CERTIFICATE OF CORRECTION

PATENT NO. : 5,404,750

DATED : April 11, 1995

INVENTOR(S) : Helmut Denz

It is certified that error appears in the above-identified patent and that said Letters Patent is hereby corrected as shown below:

In the title page, under "Other Publications", line 1: delete "Kraftfhartechnisches" and substitute -- Kraftfahrtechnisches -- therefor.

In column 2, line 40: delete "control" and substitute -- controls -- therefor.

In column 2, line 41: delete "[he" and substitute -- the -- therefor.

In column 2, line 64: delete "35°1C." and substitute -- 35°C. -- therefor.

In column 3, line 8: delete "$n_{momx}$" and substitute -- $n_{mo}$ -- therefor.

In column 3, line 19: delete "$n_{momn}$" (first occurrence) and substitute -- $n_{momx}$ -- therefor.

UNITED STATES PATENT AND TRADEMARK OFFICE
CERTIFICATE OF CORRECTION

PATENT NO. : 5,404,750

DATED : April 11, 1995

INVENTOR(S) : Helmut Denz

It is certified that error appears in the above-identified patent and that said Letters Patent is hereby corrected as shown below:

In column 6, line 24: delete "$n_{mx}$" and substitute -- $n_{1mx}$ -- therefor.

Signed and Sealed this

Sixteenth Day of January, 1996

Attest:

BRUCE LEHMAN

*Attesting Officer*  *Commissioner of Patents and Trademarks*